United States Patent
Asakura

(10) Patent No.: US 6,888,574 B1
(45) Date of Patent: May 3, 2005

(54) ELECTRONIC CAMERA HAVING A STANDBY MODE FOR REDUCING DELAYS IN IMAGE PICKUP

(75) Inventor: Yasuo Asakura, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/527,102

(22) Filed: Mar. 16, 2000

(30) Foreign Application Priority Data

Mar. 16, 1999 (JP) ............................................ 11-070099
Mar. 7, 2000 (JP) ...................................... 2000-062385

(51) Int. Cl.⁷ .......................... H04N 5/225; H04N 5/76
(52) U.S. Cl. .................................. 348/372; 348/231.99
(58) Field of Search ........................... 348/372, 333.13, 348/231.99; 396/50

(56) References Cited

U.S. PATENT DOCUMENTS

| | | | | | |
|---|---|---|---|---|---|
| 5,396,443 | A | * | 3/1995 | Mese et al. ................. | 713/321 |
| 5,886,343 | A | * | 3/1999 | Miyawaki et al. ........ | 250/208.1 |
| 6,441,854 | B2 | * | 8/2002 | Fellegara et al. ...... | 348/333.13 |
| 6,587,150 | B1 | * | 7/2003 | Toratani ..................... | 348/372 |
| 6,633,656 | B1 | * | 10/2003 | Picard ......................... | 382/124 |

FOREIGN PATENT DOCUMENTS

| | | |
|---|---|---|
| JP | 62-127514 | 8/1987 |
| JP | 63-110430 | 5/1988 |
| JP | 1-96851 | 4/1989 |
| JP | 2-89473 | 3/1990 |
| JP | 7-245736 | 9/1995 |
| JP | 7-306453 | 11/1995 |
| JP | 09 219806 | 8/1997 |
| JP | 11-7073 | 1/1999 |

* cited by examiner

*Primary Examiner*—Wendy R. Garber
*Assistant Examiner*—Rashawn N Tillery
(74) *Attorney, Agent, or Firm*—Straub & Pokotylo; John C. Pokotylo

(57) ABSTRACT

An electronic still camera includes a stand-by mode switch and is capable of setting a stand-by mode in which a power and/or driving pulse is supplied to a CCD so that the mode can immediately shift to an image pickup operation upon a release instruction by a release switch. In the camera, a plurality of sensors for detecting contact or approach of a hand to make an image pickup operation are provided dispersedly at different positions, respectively. If the stand-by mode is set by the stand-by mode switch and all the sensors detect contact or approach of the hand, each processing in an AE processing section, AF processing section, and AWB processing section is carried out as a preliminary operation for image pickup.

29 Claims, 7 Drawing Sheets

ELECTRONIC CAMERA HAVING A STANDBY MODE FOR REDUCING DELAYS IN IMAGE PICKUP

CROSS-REFERENCE TO RELATED APPLICATIONS

This application is based upon and claims the benefit of priority from the prior Japanese Patent Applications No. 11-070099, filed Mar. 16, 1999; and No. 2000-062385, filed Mar. 7, 2000, the entire contents of which are incorporated herein by reference.

BACKGROUND OF THE INVENTION

The present invention relates to an electronic still camera which picks up images with use of a solid image-pickup device and particularly to an electronic still camera which shortens the release time lag.

Widely spreading now are so-called electronic still cameras in which an object image is formed on, for example, a CCD two-dimensional image sensor by an image pickup optical system and is converted into an electric signal, and the image signal of a still image thus obtained is recorded on a recording medium such as a semiconductor memory or a magnetic disk.

This kind of electronic still camera generally takes a quite longer time from when the power is turned on to when operation can be transferred to image pickup or from when a button is operated to when image pickup action can be actually taken while the power is on than a camera using a silver film. The latter time is a so-called release time lag. Electronic still cameras are said to be weak in chances for good pictures because of the long release time lag.

Even in an electronic still camera as described above, it is possible to shorten the release time lag if a stand-by current is constantly kept flowing through the image pickup device and if preliminary operations for image pickup, e.g., automatic exposure, white balance adjustment, and automatic focus adjustment are constantly carried out at a high frequency.

However, in electronic still cameras, the capacity of a battery as a power source which electrically enables all the operations is limited. Consequently, preliminary operations for electric conductance of a stand-by current as described above or image pickup, which shorten the release time lag, are carried out thoughtlessly, the electric power is consumed wastefully and the battery lifetime is shortened greatly.

BRIEF SUMMARY OF THE INVENTION

The present invention hence has an object of providing an electronic still camera which avoids wasteful power consumption as much as possible and efficiently uses the battery as a power source whose capacity is limited, so that the release time lag can be sufficiently shortened.

The present invention is based on a concept that preliminary operations are carried out only when an intention of a user of a camera is estimated where a stand-by mode is set.

An electronic still camera according to the present invention comprises: a plurality of detection means provided respectively at different positions, for detecting contact or approach of a hand to make an image pickup operation; mode setup means for setting a stand-by mode in which a predetermined power and/or driving pulse is supplied to an image pickup device, capable of commencing an image pickup operation immediately in response to a release instruction; and image pickup control means for executing a preliminary operation for image pickup if the stand-by mode is set by the mode setup means and all the plurality of detection means detect the contact or approach.

In general, there are various ways in which a user holds a camera in instances where the user does not particularly have an intention to make an image pickup operation. In this case, it is considered that a plurality of detection means provided dispersedly at different positions of the camera rarely detect simultaneously contact or approach of a hand of the user. In contrast, in case where a user holds a camera with an intention to take a picture, the plurality of detection means detect the contact or approach with a high possibility.

The present invention hence does not always carry out electric conducting to the image pickup device and preliminary operations for image pickup but carries out the preliminary operations only when the plurality of detection means all detect contact or approach of a hand and an intention to make a preliminary operation is estimated, in a state where a stand-by mode including electric conducting to the image pickup device. In this manner, the release time lag, i.e., the time from a release instruction to entrance into an image pickup operation can be shortened without accompanying power consumption due to the preliminary operation.

Preferred embodiments of the present invention will be as follows.

(1) The electronic still camera may further comprise mode holding means using a non-volatile memory, for holding a setup state of the stand-by mode set by the mode setup means even during a power-off period.

If the setup state of the stand-by mode is maintained when the power source is off, it is possible to enter into an image pickup operation immediately when the power source is turned on next and a release instruction is supplied.

(2) The electronic still camera may A further comprise mode release means for releasing the stand-by mode when the stand-by mode is set by the mode setup means and a period in which at least one of the plurality of detection means does not detect the contact or approach reaches a predetermined time.

If a state in which no image pickup operation is carried out continues for a long time period, the stand-by mode is thus released forcedly to avoid useless electric conducting to the image pickup device in the stand-by mode, so the power consumption can be saved much more.

(3) The electronic still camera may further comprise operation control means for rendering a part of the plurality of detection means operational, when the stand-by mode is set by the mode setup means and a period in which at least one of the plurality of detection means does not detect the contact or approach reaches a predetermined time.

That is, the plurality of detection means are not always rendered operational but are rendered operational step by step so that the detection means are sequentially electrically conducted. It is considered that the electric power consumption of these detection means is originally smaller than the power consumption necessary for the preliminary operation for image pickup. However, wasteful power consumption at the detection means can be prevented by thus electrically conducting the detection means step by step.

(4) It is preferred that the plurality of detection means are provided at least at a grip part and a release button part of a camera body.

The grip part and release button part are positions which a hand always contact when making an image pickup operation. Therefore, an intention to make an image pickup operation is accurately estimated by providing detection means at these positions, and the preliminary operation for image pickup can be carried out exactly.

(5) It is preferred that the preliminary operation includes at least automatic exposure, automatic focus adjustment, and automatic white balance adjustment.

These operations are preliminary operations of a general electronic still camera, and the present invention securely carries out these operations during the image pickup operation in the stand-by mode, so the release time lag can be sufficiently shortened. Also, electric conducting to an image pickup device may be included as a preliminary operation for image pickup.

Another electronic still camera according to the present invention is based on a concept that a preliminary operation for image pickup is carried out only in case where an intention of a user to make an image pickup operation is confirmed in a state where the power source is on. The electronic still camera comprises: detection means provided near a release button, for detecting contact or approach of a hand to make an image pickup operation; a main power switch for switching on and off a power source of the camera; and image pickup control means for executing a preliminary operation for image pickup if the power switch is set on and the detection means detects the contact or approach.

An embodiment of another electronic still camera according to the present invention will be as follows.

(1) It is desirable that the preliminary operation includes at least electric conducting to an image pickup device.

According to the invention described above, it is possible to provide an electronic still camera capable of effectively shortening the release time lag while reducing wasteful power consumption which is consumed because preliminary operations for image pickup are always carried out and while effectively using the battery of the power source.

Another electronic still camera according to the present invention comprises: a plurality of detection means provided respectively at different positions, for detecting contact or approach of a hand; mode setup means for setting a stand-by mode in which a predetermined power and/or driving pulse is supplied to an image pickup device, capable of commencing an image pickup operation immediately upon a release instruction; and image pickup control means for executing a preliminary operation for image pickup if the stand-by mode is set by the mode setup means and at least one of the plurality of detection means detects the contact or approach.

Also, in this structure, preliminary operations for image pickup can be carried out only when at least one of the plurality of detection means detects contact or approach of a hand and an intention to make a preliminary operation is estimated, in a state where a stand-by mode including electric conducting to the image pickup device. Accordingly, the release time lag, i.e., the time from a release instruction to entrance into an image pickup operation can be shortened without accompanying power consumption due to the preliminary operation.

A method for controlling an electronic still camera according to the present invention comprises steps of: detecting contact or approach of a hand to a camera body, by a plurality of detection means provided respectively at different positions; bringing an image pickup system including at least an image pickup device into a stand-by state in which the imaging pickup system commences an image pickup operation immediately in response to a release instruction; and executing a preliminary operation for image pickup if the image pickup system is in the stand-by state and at least one of the plurality of detection means detects the contact or approach of the hand.

It is preferred that the preliminary operation is executed if all the plurality of detection means detect the contact or approach.

The present invention carries out the preliminary operations only when the plurality of detection means all detect contact or approach of a hand and an intention to make a preliminary operation is estimated, in a state where a stand-by mode including electric conducting to the image pickup device. In this manner, the release time lag, i.e., the time from a release instruction to entrance into an image pickup operation can be shortened without accompanying power consumption due to the preliminary operation.

Preferred embodiments of the present invention will be as follows.

(1) It is preferred that in the step of detecting, if the image pickup system is in the stand-by state and a part of the plurality of detection means detects the contact or approach of the hand to make an image pickup operation, another part of the plurality of detection means starts a detection operation.

That is, the plurality of detection means are not always rendered operational but are rendered operational step by step so that the detection means are sequentially electrically conducted. It is considered that the electric power consumption of these detection means is originally smaller than the power consumption necessary for the preliminary operation for image pickup. However, wasteful power consumption at the detection means can be prevented by thus electrically conducting the detection means step by step.

(2) It is preferred that the plurality of detection means are provided at least at a grip part and a release button part of a camera body.

The grip part and release button part are positions which a hand always contact when making an image pickup operation. Therefore, an intention to make an image pickup operation is accurately estimated by providing detection means at these positions, and the preliminary operation for image pickup can be carried out exactly.

(3) The method for controlling further comprises a step of writing a setup of the image pickup system in the stand-by state into a non-volatile memory if an input for turning off a power source is given.

If the setup state of the stand-by mode is maintained when the power source is off, it is possible to enter into an image pickup operation immediately when the power source is turned on next and a release instruction is supplied.

(4) The method for controlling further comprises a step of releasing the stand-by state when the stand-by state is set and a period in which at least one of the plurality of detection means does not detect the contact or approach of the hand reaches a predetermined time.

If a state in which no image pickup operation is carried out continues for a long time period, the stand-by mode is thus released forcedly to avoid useless electric conducting to the image pickup device in the stand-by mode, so the power consumption can be saved much more.

(5) It is preferred that the preliminary operation includes at least automatic exposure, automatic focus adjustment, and automatic white balance adjustment.

These operations are preliminary operations of a general electronic still camera, and the present invention securely carries out these operations during the image pickup operation in the stand-by mode, so the release time lag can be sufficiently shortened. Also, electric conducting to an image pickup device may be included as a preliminary operation for image pickup.

(6) It is preferred that the preliminary operation includes at least electric conducting to the image pickup device.

According to the invention described above, it is possible to provide an electronic still camera capable of effectively shortening the release time lag while reducing wasteful power consumption which is consumed because preliminary operations for image pickup are always carried out and while effectively using the battery of the power source.

Another method for controlling an electronic still camera according to the present invention is based on a concept that a preliminary operation for image pickup is carried out only in case where an intention of a user to make an image pickup operation is confirmed in a state where the power source is on. The method for controlling an electronic still camera comprises steps of: detecting contact or approach of a hand by detection means provided near a release button; switching on and off a main power source of the camera; and executing a preliminary operation for image pickup if the main power source is on and the plurality of detection means detects the contact or approach of the hand.

It is preferred that the preliminary operation includes at least electric conducting to an image pickup device.

According to the invention described above, it is possible to provide an electronic still camera capable of effectively shortening the release time lag while reducing wasteful power consumption which is consumed because preliminary operations for image pickup are always carried out and while effectively using the battery of the power source.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In the following, embodiments of the present invention will be explained with reference to the drawings.

(First Embodiment)

Figure 1:
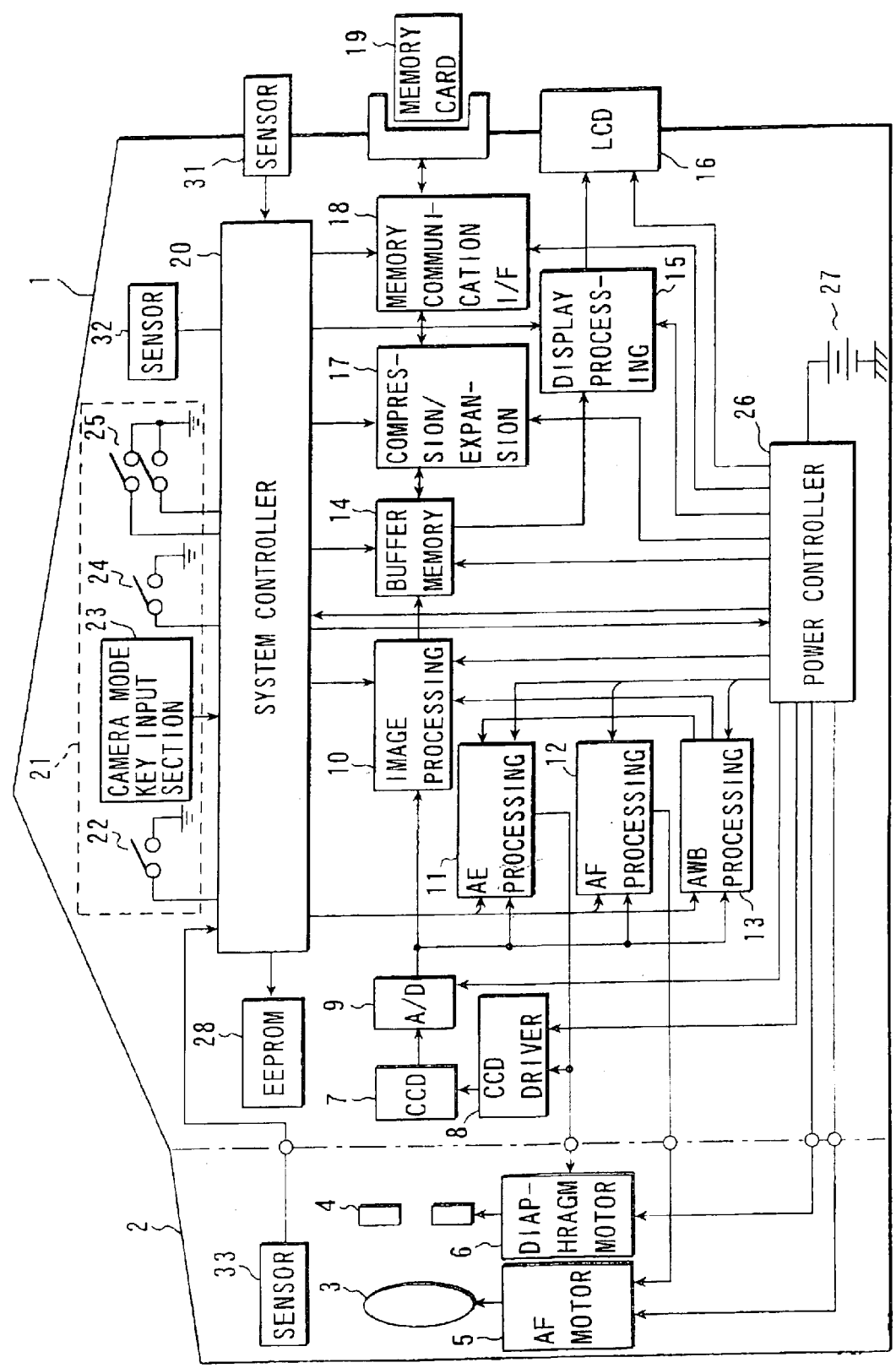
FIG. 1 is a block diagram showing the structure of an electronic still camera according to a first embodiment of the present invention.
Figure 2A:
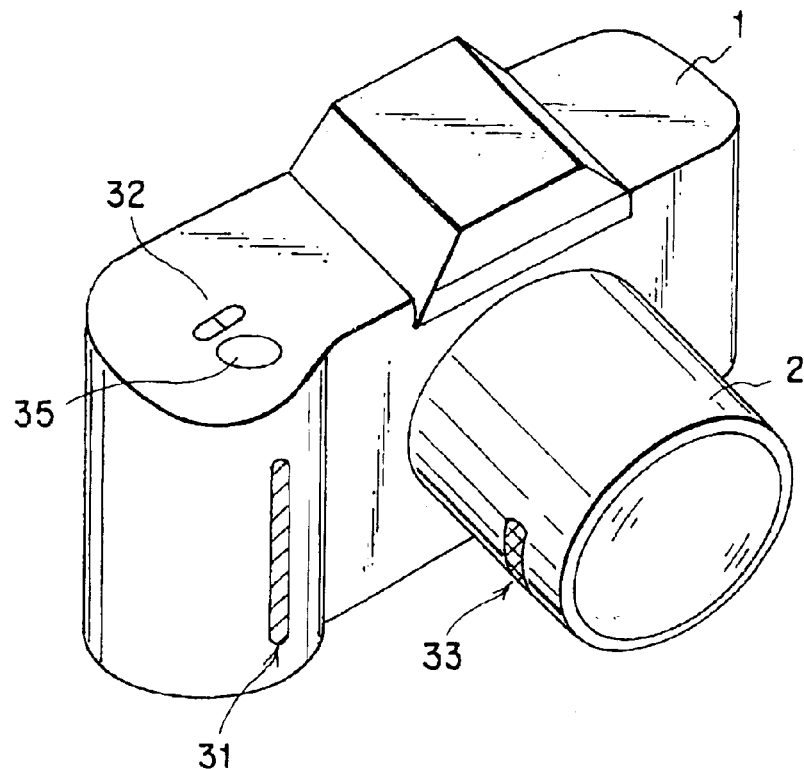
FIG. 2A is a perspective view of the electronic still camera according to the first embodiment of the present invention.
Figure 2B:
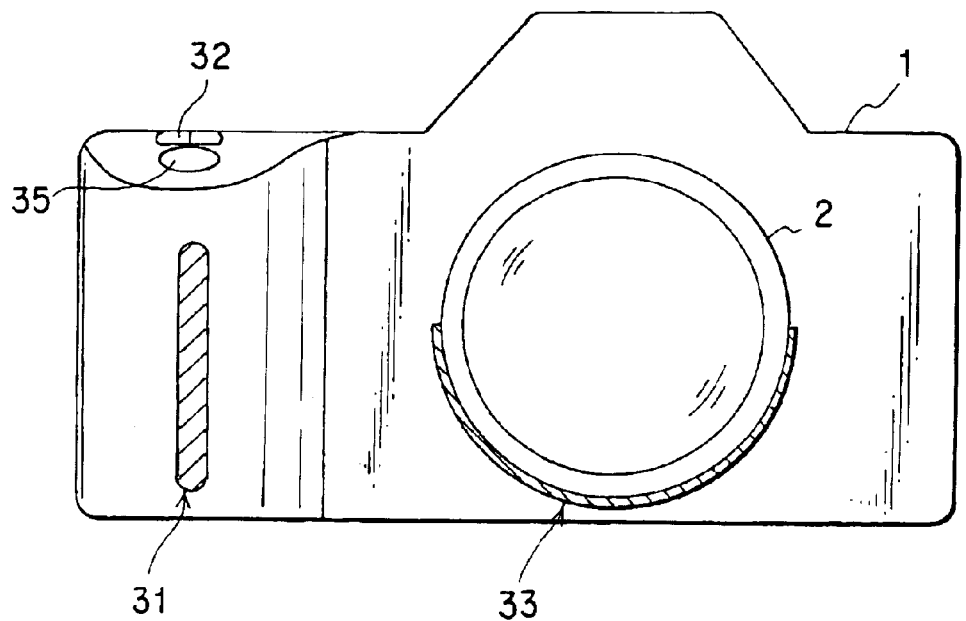
FIG. 2B is a front view thereof.

FIG. 1 is a block diagram showing the structure of an electronic still camera according to a first embodiment of the present invention. FIG. 2A is a perspective view of the electronic still camera according to the first embodiment of the present invention, and FIG. 2B is a front view thereof. This electronic still camera can roughly be divided into a camera body 1 and a lens mirror cylinder 2.

Object light passes through an image pickup lens 3 provided in the lens mirror cylinder 2 and the light amount is controlled by a diaphragm 4. The image pickup lens 3 is driven by an AF motor 5, and the diaphragm 4 is driven by a diaphragm motor 6. The object light which has passed through the image pickup lens 3 and the diaphragm 4 is introduced into the camera body 1 and enters into a CCD two-dimensional color image sensor (hereinafter referred to simply as a CCD) 7. In this manner, an object image is formed on the image pickup surface of the CCD 7.

In the CCD 7, the image pickup surface is constructed by arranging a plurality of pixels which perform photoelectric conversion in a two-dimensional matrix, and a color filter is provided on the image pickup surface. The CCD 7 is driven by a CCD driver 8 and stores signal charges corresponding to an object image formed on the image pickup surface. The signal charges stored at the image pickup surface are read out as electric signals called pixel signals from the CCD 7.

The pixel signals read from the CCD 7 are converted into a digital signal by an A/D converter 9 and are thereafter inputted to an image processing section 10, an AE (automatic exposure) processing 11, an AF (Automatic focus adjustment) processing section 12, and an AWB (automatic white balance adjustment) section 13.

In the image processing section 10, processing such as separation of a color signal, CDS (correlative double sampling), and the like is performed on the pixel signals thereby to generate a color image signal in a predetermined format.

The AE processing section 11 receives the digitalized pixel signals outputted from the A/D converter 9 and performs calculation processing mainly based on cumulative addition of the pixel signals from the respective pixels. Further, the AE processing section 11 obtains an AE evaluation value (photometric value) corresponding to the brightness of the object, based on the value of the cumulative addition, and controls the diaphragm 4 based on the AE evaluation value thereby to control the light amount. Further, the AE processing section 11 controls the charge storage time of the CCD 7 through the CCD driver 8 thereby to perform automatic exposure (AE) processing.

The AF processing section 12 receives the digitalized pixel signals outputted from the A/D converter 9 and extracts a high-frequency component of, for example, a pixel signal for one pixel. The AF processing section 12 performs calculation processing such as cumulative addition or the like on the extracted high-frequency component, thereby to calculate an AF evaluation value corresponding to a contour component amount in the high band side. Further, the AF processing section 12 controls the image pickup lens 3 in the optical axis direction through the AF motor 5, based on the AF evaluation value, thereby to perform automatic focus adjustment (AF) processing.

The AWB processing section 13 receives the digitalized pixel signals outputted from the A/D converter 9 and performs automatic white balance adjustment (AWB) processing. The automatic white balance adjustment processing means processing for controlling generation of a color image signal by the image processing section 10 so that the white color is properly reproduced independently from the color temperature of the object.

A buffer memory 14 is a storage device for temporarily storing a color image signal generated by the image processing section 10. The color image signal read from the buffer memory 14 is introduced to the display section 15, converted hereby into a form suitable for a display output, and thereafter supplied to a color liquid crystal display (LCD) 16 according to a TFT system where the signal is displayed as an image.

The buffer memory is further connected with a compression/expansion processing section 17 which is connected through a memory communication interface 18 to a memory card 19 as a recording medium for recording image data and data appended thereto.

A compression/expansion processing section 17 is comprised of a compression processing section and an expansion processing section. The compression processing section reads an image signal stored in the buffer memory 14 and performs compression (coding) processing thereon, to encode the signal into a form suitable for recording onto a memory card 19. The expansion processing section reads an image signal recorded on the memory card 19 and performs expansion (decoding) processing thereon. The image signal thus subjected to expansion processing is temporarily stored into the buffer memory 14 and is outputted and displayed on the liquid crystal display 16 through the display processing section 15.

The memory card 19 is constructed by using a semiconductor memory such as a card-type flash memory or the like. Note that the recording medium comprised in the electronic still camera according to the present invention is not limited to this memory card 19 but may be one of various forms, e.g., magnetic media such as a hard disk, a floppy disk, and the like.

A system controller 20 serves to control respective sections based on an instruction from an operating section and is constructed by using a CPU. Specifically, the system controller 20 controls the image processing section 10, AE processing section 11, AF processing section 12, AWB processing section 13, buffer memory 14, display processing section 15, compression/expansion processing section 17, memory communication interface 18, and a power source controller 26 which will be described later.

The operating section 21 is a device for allowing a user to input instructions for operating the camera. The operating section 21 generates an instruction signal for executing various operations based on an input operation from a user and transmits the instruction signal to the system controller 20. Specifically, the operating section 21 is provided with a main power switch 22 for generating an instruction signal to start the camera and perform power supply, a camera mode key input section 23 for specifying various modes concerning image pickup, display, recording and the like, a stand-by mode switch 24 for setting a stand-by mode, and a release switch 25 for generating an instruction signal to start image pickup operation.

The release switch 25 comprises a first-step release switch, and a second-step release switch. The first-step release switch is used to generate an instruction signal for starting AE processing, AF processing, and AWB processing which are preliminary operations prior to image pickup operation. The second-step releaser switch is used to generate an instruction signal for starting actual image pickup operation in response to the instruction signal generated by the first-step releaser switch. Hereinafter, switching-on of only the first-step release switch is on is called a half-press, and switching-on of the second-step release switch together with the first-step release switch is on is called a full-press.

The stand-by mode set by the stand-by mode switch 24 is a mode in which the camera can be switched over to image pickup operation immediately upon a release instruction, i.e., a full-press of the release switch 25 (e.g., when the first-step and second-step release switches are turned on). In this stand-by mode, a predetermined power and/or driving pulse is supplied to the CCD 7 by the CCD driver 8. Several other operations may be included.

The power controller 26 is connected with a battery 27 which serves as a power source of the camera. The power controller 26 performs control for supplying respective sections of the camera (e.g., the AF motor 5, diaphragm motor 6, CCD driver 8, A/D converter 9, image processing section 10, AE processing section 11, AF processing section 12, AWB processing section 13, buffer memory 14, display processing section 15, liquid crystal display 16, compression/expansion processing section 17, and memory communication interface 18) with a power source voltage, based on control by the system controller 20. Note that the system controller 20 is constantly supplied with the battery 27 through the power source controller 26.

An EEPROM 28 as a nonvolatile memory is an electrically re-writable memory and is connected with the system controller 20. This EEPROM 28 previously stores various control programs and data inputted through the camera mode key input section 23 used for performing various operations. Further, the EEPROM 28 stores and maintains a setup state of the stand-by mode when a standby-mode is set by the stand-by mode switch 24, as described later.

The system controller 20 performs control concerning maintenance of a setup state of the stand-by mode. Also, the system controller 20 is capable of appropriately releasing the stand-by mode held in the EEPROM 28. The system controller 20 is further connected with sensors 31, 32, and 33.

The sensors 31, 32, and 33 serve to detect contact or approach of a hand (including the palm and fingers) of a user to make image pickup operation. Therefore, the sensors are provided dispersedly at different positions so that the hand of a user can contact or come close to them during image pickup operation. In addition, these sensors 31, 32, and 33 are provided to estimate whether or not the user of the camera holds the camera with an intension to take a picture.

Each of the sensors 31, 32, and 33 is rendered operational by conducting predetermined electricity through the system controller 20. Accordingly, the system controller 20 has a function to control individually the operation states, i.e., presence or absence of electric conductance to each of the sensors 31, 32, and 33.

FIGS. 2A and 2B show an example of layout of the sensors 31, 32, and 33. As shown in each figure, the sensors 31, 32, and 33 are respectively provided at a grip part of the camera body 1, near the release button 35 as an operating part of the release switch 25 (a detectable range of the sensor 32 in the vicinity of the release button 35 will be hereinafter called a releaser button part), and at a position in the lower half of the outer circumferential surface of the lens mirror cylinder 2. Touch sensors such as pyroelectric sensors may be used for the sensors 31 and 33. Also, a photosensor or the like may be used for the sensor 32. The sensors 31, 32, and 33, however, may be basically any device as long as the device can detect contact or approach of a hand of a user.

Accordingly, when a user seizes the grip part of the camera body 1 by hand, the sensor 31 detects contact of a hand of the user. When the user puts a finger near the release button 35 to operate the releaser switch 25 to start image pickup, the sensor 32 detects approach of the finger. When the user further seizes the lens mirror cylinder 2, the sensor 33 detects contact or approach of a hand of the user. Since the sensor 33 is provided at a position in the lower half of the outer circumferential surface of the lens mirror cylinder 2, the sensor 33 contacts the hand of the user and detects contact of a hand of a user in both of the case of holding the camera body 1 in a lateral position as shown in FIG. 2B and the case of holding it in a longitudinal position perpendicular to the lateral position.

The system controller 20 receives detection signal from the sensors 31, 32, and 33 individually. Further, the system controller 20 performs control for executing preliminary operations for image pickup when all the sensors 31, 32, and 33 are detect contact or approach of a hand of a user, i.e., when all the sensors are brought into a state for detecting contact or approach of a hand of the user to make image pickup operation. Note that the preliminary operations include at least electric conducting to the CCD 7 and processing of each of the AE processing section 11, AF processing section 12, and AWB processing section 13, i.e., processing of each of automatic exposure, automatic focus adjustment, and automatic white balance adjustment.

Next, with reference to the flowchart shown in FIG. 3, explanation will be made of the procedure of image pickup processing in the present embodiment and particularly the operation for shortening the release time lag. Note that these operations are realized as control by the system controller 20 and as processing made by the system controller 20 itself.

At first, the main power switch 22 is pressed down and the power source is turned on (step S1). Then, various initial setups are carried out by the system controller 20 (step S1). Next, whether or not the switch 25 is half pressed, i.e., whether or not the first-step release switch is turned on is determined (step S2). If the release switch 25 is half pressed, AF processing (step S3), AE processing (step S4), and AWB processing (step S5) as preliminary operations are executed sequentially. Of course, if it is determined in the step S2 that the release switch 25 is half pressed, the predetermined power and/or driving pulse is supplied to the CCD 7. To execute the AF processing, AE processing, and AWB processing, the CCD 7 must be electrically conducted.

Next, whether or not the release switch 25 is full pressed, i.e., whether or not the second-step release switch is turned on in addition to the first-step release switch is determined (step S6). As a result of this determination, if the release switch 25 is full pressed, actual image pickup operation is carried out considering that a release instruction is issued, i.e., image pickup operation at the CCD 7 (step S7), image processing at the image processing section 10 (step S8), and recording onto the memory card 19 through the buffer memory 14, compression/expansion processing section 17, and the memory communication interface 18 (steps S9) are carried out sequentially. When recording in the step S9 is finished and when the release switch 25 is not full pressed, the program returns to the step S2 and the operation as described above is repeated.

When the release switch 25 is thus half pressed, the preliminary operations for image pickup, i.e., the power and/or driving pulse is supplied to the CCD 7 and the processing in the steps S3, S4, and S5 are carried out. When the release switch 25 is full pressed sequentially, the actual image pickup operation (step S7), image processing (step S9), and recording (step S8) are carried out. Execution of these operations is not related to whether or not a stand-by mode is set.

Otherwise, if it is determined in the step S2 that the release switch 25 is not half pressed, whether or not a stand-by mode is on, i.e., whether or not a stand-by mode is set by the stand-by mode switch 24 is determined (step S10). This determination is carried out by referring to the setup state of the standby mode stored and maintained in an EEPROM 28.

If the stand-by mode is on, the power is supplied to the sensor 31 at first (step S11). Further, whether or not the sensor 31 detects a hand of a user is determined subsequently (step S12).

As a result of this determination, if the sensor 31 detects a hand of the user, power is supplied to the sensors 32 and 33 and then brought into an operational state (step S13). Subsequently, whether or not the sensor 32 detects approach of a hand of the user, i.e., whether or not a hand of the user has come close to the release switch 25 of the camera body 1 is determined (step S14).

Further, the power is supplied to the sensor 33 is electrically conducted and brought into an operational state, and whether or not the sensor 33 detects a hand of the user, i.e., whether or not a hand of the user is in contact with the lens mirror cylinder 2 is determined (step S15). The order of the processing of the steps S14 and S15 is not critical.

In the steps S12, 514, and S15, if it is determined that the sensors 31, 32, and 33 are in a detecting state in which they detect contact or approach of a hand of the user, the operation goes to the step S16 and the timer in the system controller 20 is reset. Thereafter, the operation goes to the step S3 and the processing in the steps S3 to S9 is carried out.

That is, where the stand-by mode is set, if all the sensors 31, 32, and 33 are determined as being in the detecting state in which the sensors 31, 32, and 33 detect contact or approach of a hand of the user, it is determined that the user of the camera has an intention to carry out image pickup operation, and the power and driving pulse supplying is supplied to the CCD 7, AF processing in the step S3, AE processing in the step S4, and AWB processing in the step S5 as preliminary operations for image pickup. In this manner, it is possible to enter into the actual image pickup operation (steps S7, S8, and S9) immediately in response to a full press of the release switch 25.

Otherwise, if it is determined in the step S12 that the sensor 31 does not detect contact of a hand of the user or if it is determined in the steps S14 and S15 that at least one the sensors 32 and 33 does not detect contact or approach of a hand of the user, the value of the timer in the system controller 20 is incremented one by one at a predetermined time interval during this no-detecting period (step S17). Further, if it is determined in the step 518 that the value of the timer has reached a setup value (time limit), the stand-by mode stored and maintained in the EEPROM 28 is released (step S19).

If the value of the time has not yet reached the setup value of if the stand-by mode is released in the step S19, whether or not the stand-by mode switch 24 is turned on is determined next (step S20). If the stand-by mode switch 24 is turned on in the step S20, the stand-by mode is inverted to on from off (step S21), and this state is stored and maintained in the EEPROM 28.

If the stand-by mode is kept off in the step S20 or if the stand-by mode is inverted to on in the step S21, whether or not the power source is turned off by the main power switch 22 is determined in the step S22. If the power source is not off, i.e., if the power source is kept on, the operation returns to the step S2, and the processing described above is repeated. If the power source is turned off in the step S22, all the processing ends (step S23).

Thus, in a state where the stand-by mode is set, power and driving pulse supplying to the CCD 7, AF processing, AE processing, and AWB processing as preliminary operations for image pickup only are carried out only in the case where all the sensors 31, 32, and 33 are in their detecting states in which all the sensors detect contact or approach of a hand of a user, like in the case where the release switch 25 is half pressed. Further, the operation is immediately shifted to image pickup operation in response to a full press of the release switch 25 as a release instruction for starting image pickup, so the release time lag is shortened.

In a method in which not only power supplying to the CCD 7 but also AF processing, AE processing, and AWB processing are carried out as preliminary operations for image pickup, for example, problems are caused as follows. That is, even when a user does not have an intention to carry out image pickup operation immediately but merely holds or put a camera, the electric power is wastefully consumed for preliminary operations. In contrast, in the present embodiment, preliminary operations for image pickup are not carried out in a state where the camera is simply set in a stand-by mode but are carried out only when the user holds the camera to take a picture. Therefore, it is possible to realize shortening of the release time lag while reducing wasteful power consumption.

Also, in the present embodiment, the camera does not enter into preliminary operations in a state where the user does not have an intention to take a picture. This is because the camera enters into the preliminary operations only when all of a plurality of sensors 31, 32, and 33 are brought into detecting states in which the sensors detect contact or approach of a hand of the user.

In particular, the sensors 31 and 32 are provided respectively at the grip part and the release button part which are positions where a hand of the user must contact when making an image pickup operation. Hence, the camera can be shifted to preliminary operations by detecting an image pickup operation more steadily, without hindering the effect of shortening the release time lag.

Meanwhile, in the present invention, consideration must be taken into power consumption owing to providing additionally the sensors 31, 32, and 33. However, the power consumption of these sensors 31, 32, and 33 is not originally large. In addition, in the present embodiment, the sensors 31, 32, and 33 are rendered operational not simultaneously but one after another to make detection sequentially, and therefore, the substantial power consumption of each sensor is very small.

Also, the present embodiment has explained with respect to the case where a part or all of the sensors 31, 32, and 33 are kept off (in non-detecting states) over a setup value of the timer in a state where the stand-by mode is set. In this case, wasteful electric supplying to the CCD 7 due to continuation of the stand-by mode when the user does not have an intention to pick up an image is avoided by forcedly releasing the stand-by mode, so the power consumption can be saved much more.

(Second Embodiment)

Figure 4A:
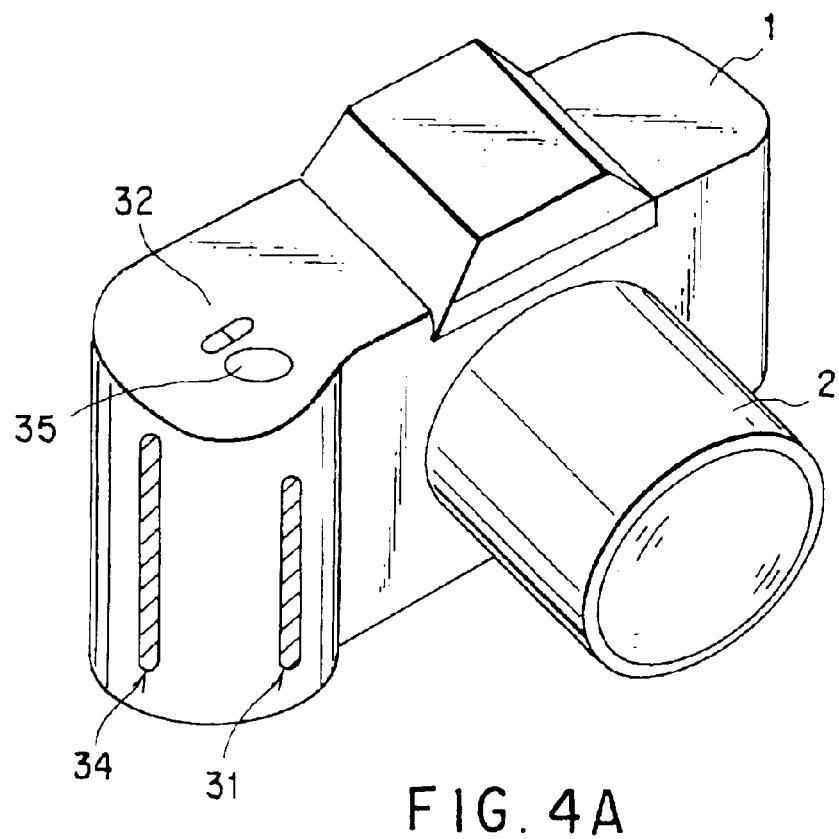
FIG. 4A is a perspective view of the electronic still camera according to a second embodiment of the present invention.
Figure 4B:
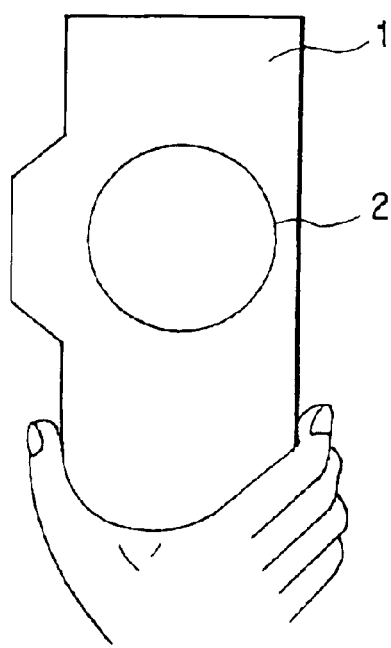
FIG. 4B is a front view thereof.

FIGS. 4A and 4B show an example of layout of sensors in an electronic still camera according to another embodiment of the present invention. In the present embodiment, the sensor 31 is provided in the front surface side of the grip part of the camera body 1 and a sensor 34 is provided in the side surface side of the of the grip part. Like in the first embodiment, the sensor 32 is provided at the release button part.

The sensor 34 is thus additionally provided to respond to various ways of holding the camera. For example, when the camera is held longitudinally with the grip part situated lower as shown in FIG. 4B, the sensor 34 securely detects a hand of the user even if the sensor 31 does not detect a hand of the user. Accordingly, in the present embodiment, it is determined that the user has an intention to take a picture and preliminary operations are carried out for taking a picture if at least one of the sensors 31 and 34 is on and if the sensor 32 is on in a state where the stand-by mode is set. As a result, it is possible to attain the same effect as that of the foregoing embodiment.

Although the sensor 33 as shown in FIGS. 2A and 2B is not provided at the side surface part of the lens mirror cylinder 2 the present embodiment, the sensor 33 may be added. In this case, preliminary operations for image pickup may be carried out when at least one of the sensors 31 and 34 is on and the sensors 32 and 33 are on in a state where the stand-by mode is set.

Next, with reference to the flowchart shown in FIG. 5, explanation will be made of another example of operation for shortening the release time lag in the embodiment described above. These operations are realized as control by the system controller 20 and the processing of the system controller 20 itself.

Figure 5:
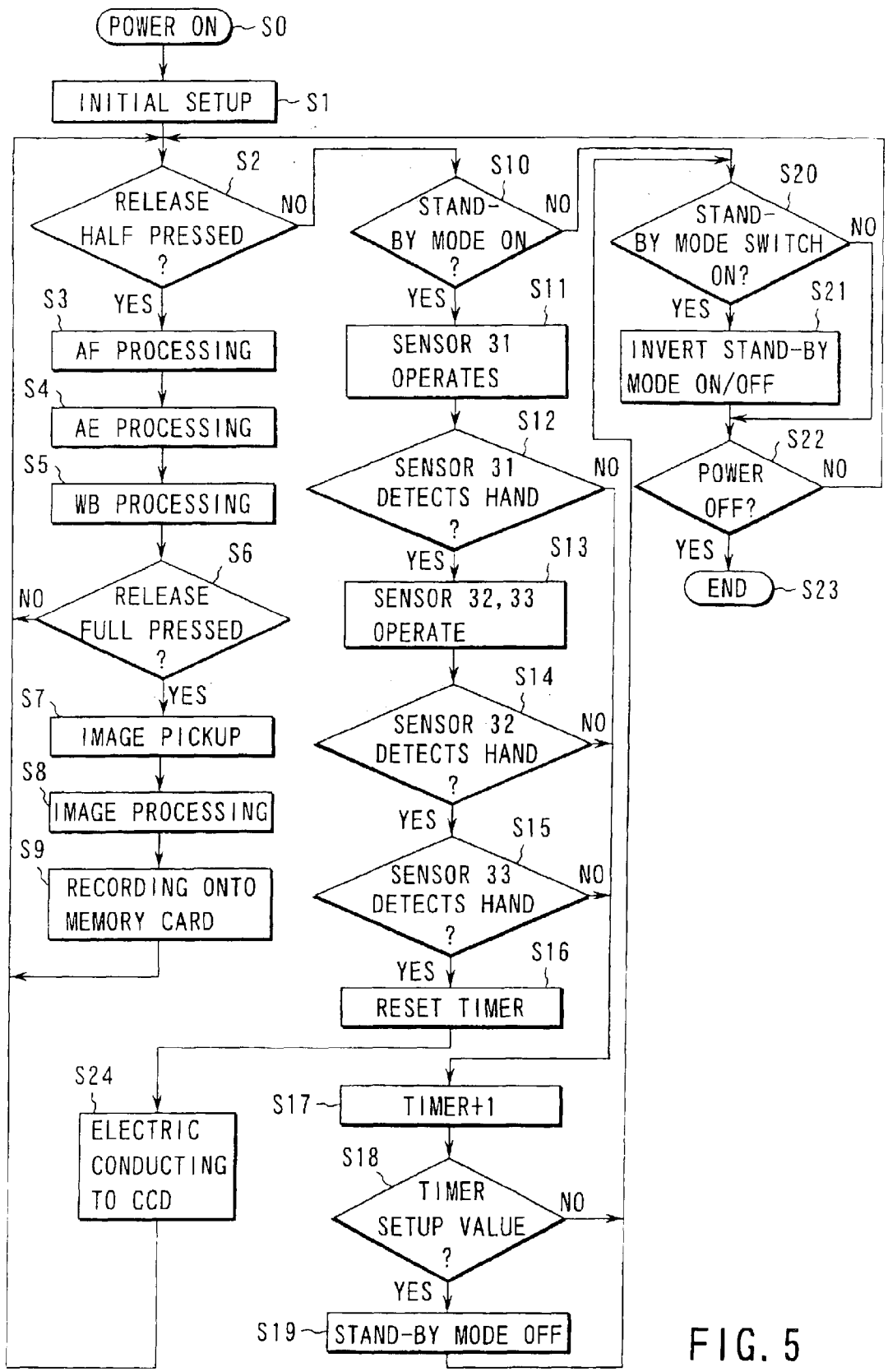
FIG. 5 is a flowchart showing another processing procedure of image pickup operation in the first embodiment.

In FIG. 5, the same processing steps as those in FIG. 3 will be denoted at the same references, and different points from FIG. 3 will be explained.

Figure 3:
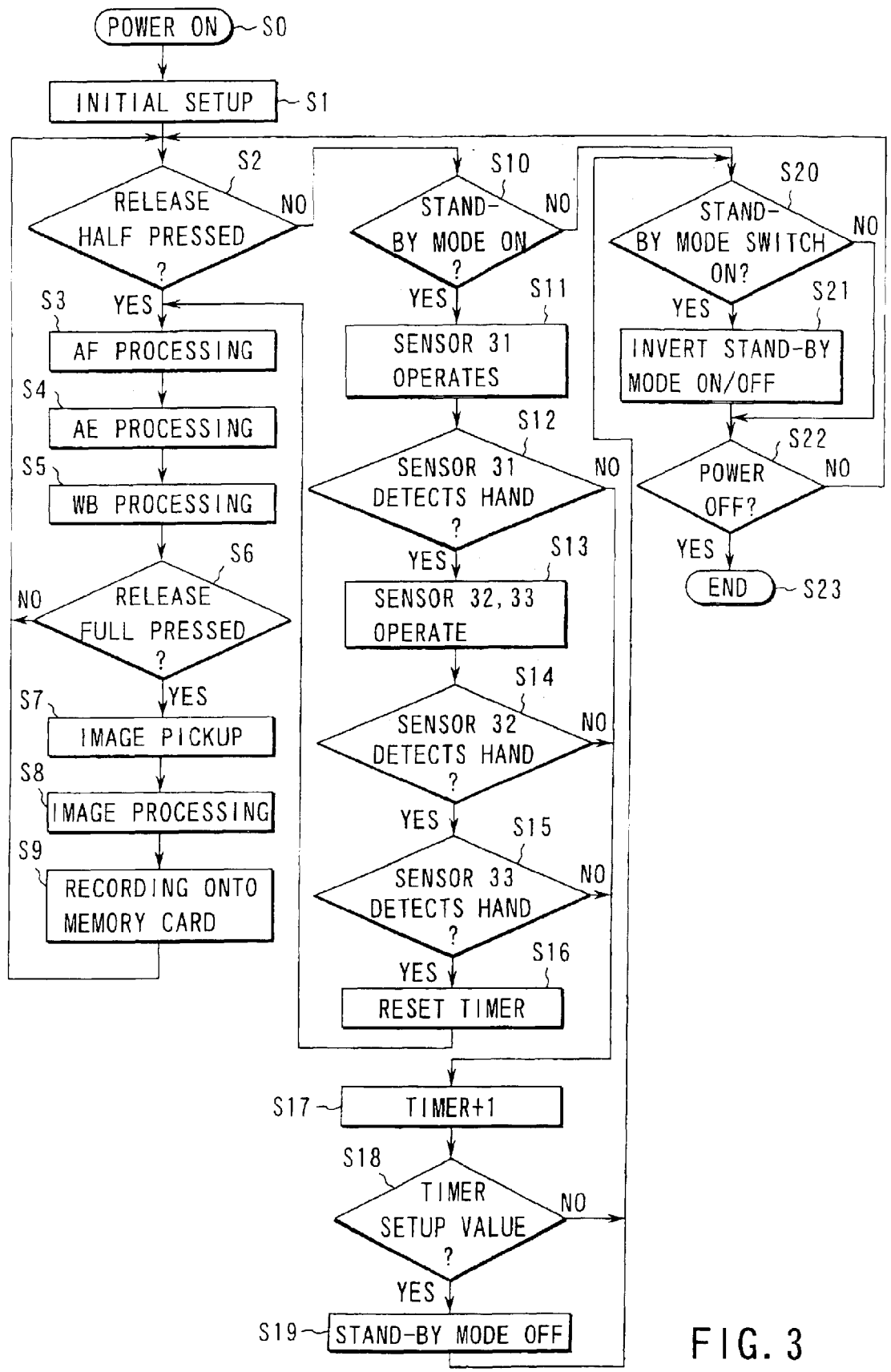
FIG. 3 is a flowchart showing a processing procedure of image pickup operation in the embodiment.

The operation in FIG. 5 differs from that of FIG. 3 in that when the timer is reset in the step S16, the CCD 7 is electrically conducted in a step S24 and the operation thereafter returns to the step S2.

Thus, the preliminary operations for image pickup, including the supplying of the power and/or driving pulse to the CCD 7, are carried out if the power source of the camera is set on by the main power switch 22, if the switch 32 is determined as a detecting state in which the switch 32 detects contact or approach of a hand of a user, and if an intention of the user to make an image pickup operation is confirmed. As a result, it is possible to obtain the same effect as obtained by the operation in FIG. 3. In this operation example, the power and/or driving pulse is not supplied to the CCD 7 for the first time when the release button is half pressed. That is, in a state where the stand-by mode is set, the CCD 7 is drawn to an operating state thereof immediately if all the sensors 31, 32, and 33 are on. The operation further goes to the step S2, and AF processing (step S3), AE processing (step S4), and AWB processing (step S5) can be executed immediately without waiting for electric conducting to the CCD 7. The release time lag can be shortened much more.

(Third Embodiment)

Figure 6:
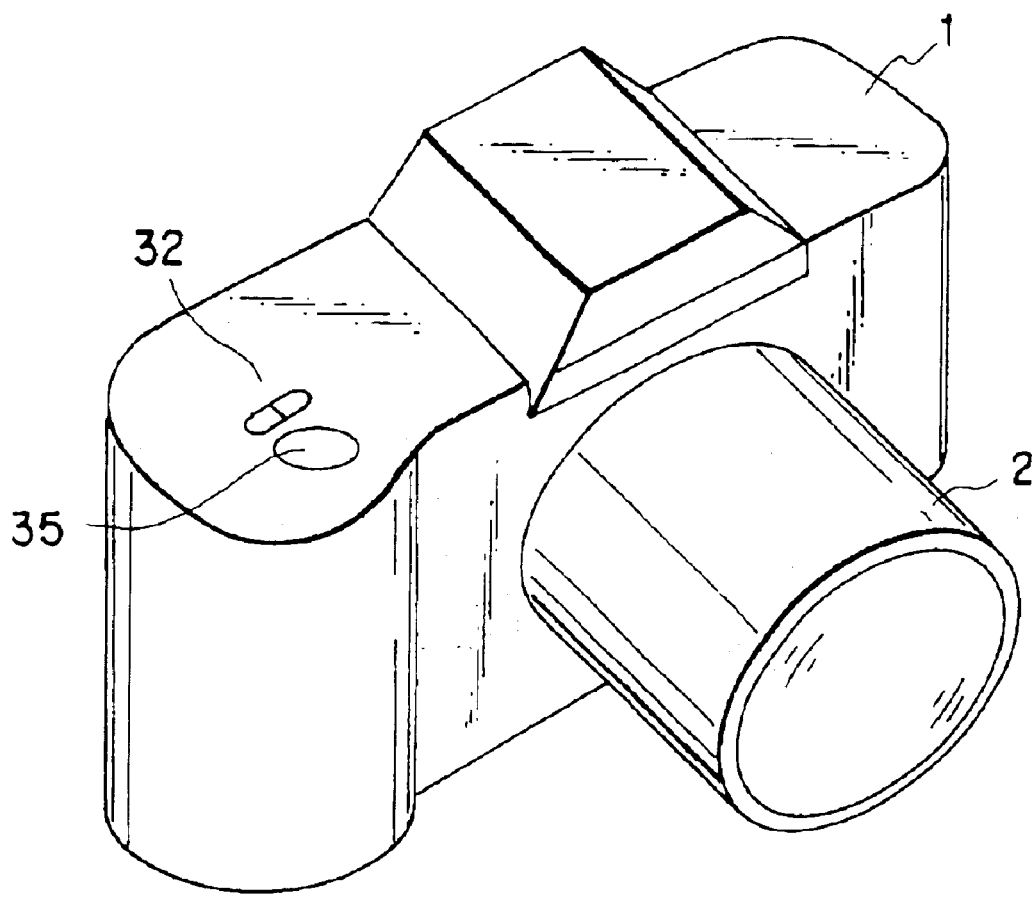
FIG. 6 is an outer view showing a layout example of an image pickup estimation sensor in an electronic still camera according to a third embodiment.

FIG. 6 shows a layout example of sensors in an electronic still camera according to further another embodiment of the present invention. The present embodiment includes only the sensor 32 provided in the vicinity of the release button 35 and is characterized in that preliminary operations for image pickup are carried out if the power source is set on by the main power switch 22 and if the sensor 32 has detect contact or approach of a hand of a user.

Next, with reference to the flowchart shown in FIG. 7, explanation will be made of an example of operation for shortening the release time lag in the present embodiment. These operations are released as control by the system controller 20 and processing of the system controller 20 itself.

Figure 7:
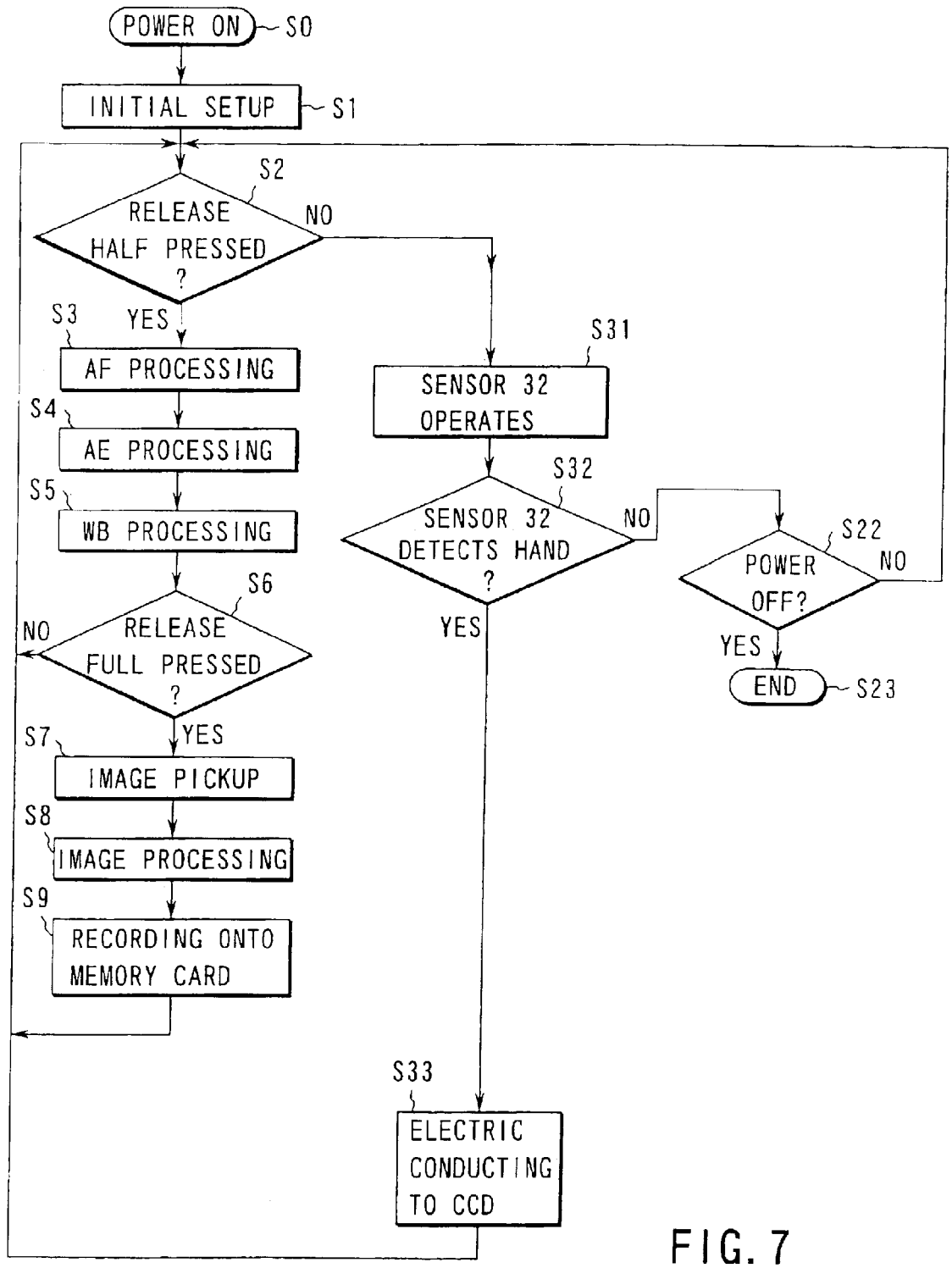
FIG. 7 is a flowchart showing a processing procedure of image pickup operation in the embodiment.

The processing steps S0 to S9 in FIG. 7 are the same as those in FIGS. 3 and 5. That is, when the main power switch 22 is pressed down and the power source is turned on (step S0), various initial setups are carried out by the system controller 20 (step S1). Next, whether or not the release switch 25 is half pressed by the user, i.e., whether or not the first-step release switch is turned on is determined (step S2). If it is determined in the step S2 that the release switch 25 half pressed, AF processing (step S3), AE processing (step S4), and AWB processing (step S5) as preliminary 34 operations for image pickup are sequentially executed.

Subsequently, whether or not the release switch 25 is full pressed, i.e., whether or not the second-step release switch is turned on in addition to the first-step release switch is determined (step S6). As a result of this determination, if the release switch 25 is full pressed, actual image pickup operation is carried out considering that a release instruction is issued, i.e., image pickup operation at the CCD 5 (step S7), image processing at the image processing section 10 (step S8), and recording onto the memory card 19 through the buffer memory 14, compression/expansion processing section 17, and the memory communication interface 18 (steps S9) are carried out sequentially.

When the release switch 25 is thus half pressed, the preliminary operations for image pickup (steps S3, S4, and S5) are carried out. When the release switch 25 is full pressed sequentially, the actual image pickup operation (step S7), image processing (step S8), and recording (step S9) are carried out.

Otherwise, if it is determined in the step S2 that the release switch 25 is not half pressed, the same processing as in the steps S13 and S14 shown in FIGS. 3 and 5 is carried out. That is, the sensor 31 is drawn to the operating state at first (step S31), and subsequently, whether or not the sensor 32 detects contact or approach of a hand of the user, i.e., whether or not a hand of the user is close to the release switch 25 of the camera body 1 is determined (step S32).

If it is then determined in the step S32 that the sensor 32 is in a detecting state in which a hand of the user is close to the release switch 25, the CCD 7 is electrically conducted as a preliminary operation fu for image pickup (step S33). Subsequently, the operation returns to the step S2 and the processing in the steps S2 to S9 described above is repeated. That is, when the sensor 32 detects contact or approach of a hand of the user in a state where the stand-by mode is set, it is determined that the user of the camera has an intention to carry out image pickup operation, and the electric conducting to the CCD 7 is carried out as a preliminary operation for image pickup are carried out. At this time, if the release switch is half pressed, the AF processing in the step S3, AE processing in the step S4, and AWB processing in the step S5 as other preliminary operations for image pickup are further carried out. In this manner, it is possible to enter into the actual image pickup operation (steps S7, S8, and S9) immediately in response to a full press of the release switch 25.

Otherwise, if it is determined in the step S32 that the sensor 32 does not detect contact or approach of a hand of the user, whether or not the power source has been turned off by the main power switch 22 is determined in the step S22. If the power source is not off, i.e., if the power source is kept on, the operation returns to the step S2, and the processing described above is repeated. Otherwise, if the power source is turned off in the step S22, all the processing ends (step S23).

In the present embodiment, as shown in FIG. 7, if the power source is set on by the main power switch 22 and if the sensor 32 detects contact or approach of a hand of a user, preliminary operations for image pickup are carried out. In this respect, the structure may be arranged in consideration of setup of the stand-by mode, like in the electronic image pickup device explained in the first and second embodiments. That is, electric conducting to the CCD 7 may be started if the sensor detects contact or approach of a hand of the user in a state where the power source is set on by the main power switch 22 and the stand-by mode is set, and further, preliminary operations for image pickup may be executed if the release switch 25 is half pressed.

Additional advantages and modifications will readily occur to those skilled in the art. Therefore, the present invention in its broader aspects is not limited to the specific details, representative devices, and illustrated examples shown and described herein. Accordingly, various modifications may be made without departing from the sprit or scope of the general inventive concept as defined by the appended claims and their equivalents.

What is claimed is:

1. An electronic camera comprising:
    a plurality of detectors which are provided corresponding to a position of a hand holding the camera during an image pickup, each of which detectors being adapted to detect contact or approach of a hand to make an image pickup operation;
    a mode setup unit which sets up a stand-by mode in which an image pickup device can commence an image pickup operation immediately in response to a release instruction, wherein the stand-by mode is set, a preliminary operation for image pickup can be entered even if a shutter release switch is not pressed; and
    an image pickup controller which controls the camera to perform a preliminary operation for image pickup if both the stand-by mode is set by the mode setup unit all of the plurality of detectors detect the contact or approach of a hand, wherein the preliminary operation can commence even if a shutter release switch is not pressed.

2. A camera according to claim 1, further comprising mode holding means using a non-volatile memory, which holds a setup state of the stand-by mode set by the mode setup unit even during a power-off period.

3. A camera according to claim 1, further comprising a mode release unit which releases the stand-by mode when the stand-by mode is set by the mode setup unit and a period in which at least one of the plurality of detectors does not detect the contact or approach of a hand reaches a predetermined time.

4. A camera according to claim 1, further comprising operation controller which renders only a part of the plurality of detectors operational, when the stand-by mode is set by the mode setup unit and a period in which at least one of the plurality of detectors does not detect the contact or approach of a hand reaches a predetermined time.

5. A camera according to claim 1, wherein the plurality of detectors are provided at least at a grip part and proximal to a release button part of a camera body.

6. A camera according to claim 1, wherein the preliminary operation includes at least automatic exposure, automatic focus adjustment, and automatic white balance adjustment.

7. An electronic camera comprising:
a detector which is provided near a release button and adapted to detect an approach of a hand to the release button to make an image pickup operation;
a main power switch which switches on and off a power source of the camera; and
an image pickup controller which executes a preliminary operation for image pickup so that an image pickup operation can occur immediately in response to a release instruction, if both the power switch is set on and the detector detects the approach of a hand, wherein the preliminary operation for image pickup can commence even if a shutter release switch is not pressed.

8. A camera according to claim 1, wherein the preliminary operation includes at least electric conducting to an image pickup device.

9. An electronic camera comprising:
a plurality of detectors which are provided corresponding to a position of a hand holding the camera during an image pickup, each of which detectors being adapted to detect contact or approach of a hand;
a mode setup unit which sets up a stand-by mode in which an image pickup device can commence an image pickup operation immediately in response to a release instruction, wherein the stand-by mode is set, a preliminary operation for image pickup can be entered even if a shutter release switch is not pressed; and
an image pickup controller which executes a preliminary operation for image-pickup if both the stand-by mode is set by the mode setup unit, and at least one of the plurality of detectors detects the contact or approach of a hand, wherein the preliminary operation can commence even if a shutter release switch is not pressed.

10. A method for controlling an electronic camera, comprising:
detecting contact or approach of a hand to a camera body, by each of a plurality of detectors which are provided corresponding to a position of a hand holding the camera during an image pickup;
bringing an image pickup system including at least an image pickup device into a stand-by state in which the image pickup system can commence an image pickup operation immediately in response to a release instruction, wherein if the stand-by state mode is set, a preliminary operation for image pickup can be entered even if a shutter release switch is not pressed; and
executing a preliminary operation for image pickup if both, and all the plurality of detectors detect the contact or approach of a hand, wherein the preliminary operation can commence even if a shutter release switch is not pressed.

11. A method according to claim 10 wherein when detecting, if the image pickup system is in the stand-by state and a part of the plurality of detectors detects the contact or approach of a hand to make an image pickup operation, another part of the plurality of detectors that was previously non-operational, starts a detection operation.

12. A method according to claim 10, wherein the plurality of detectors are provided at least at a grip part and a release button part of a camera body.

13. A method according to claim 10, further comprising writing a setup of the image pickup system in the stand-by state into a non-volatile memory if an input for turning off a power source is given.

14. A method according to claim 10, further comprising releasing the stand-by state when the stand-by state is set and a period in which at least one of the plurality of detectors does not detect the contact or approach of a hand reaches a predetermined time.

15. A method according to claim 10, wherein the preliminary operation includes at least automatic exposure, automatic focus adjustment, and automatic white balance adjustment.

16. A method according to claim 10, wherein the preliminary operation includes at least electric conducting to the image pickup device.

17. A method for controlling an electronic camera, comprising:
detecting an approach of a hand to a release button by a detector provided near the release button;
switching on and off a main power source of the camera; and
executing a preliminary operation for image pickup so that an image pickup operation can occur immediately in response to a release instruction, if both the power switch is set on and the detector detects the approach of a hand wherein a preliminary operation for image pickup can commence even if a shutter release switch is not pressed.

18. A method according to claim 17, wherein the preliminary operation includes at least electric conducting to an image pickup device.

19. A method for controlling an electronic camera, comprising:
detecting contact or approach of a hand to a camera body using each of a plurality of detectors which are provided corresponding to a position of a hand holding the camera during image pickup;
bringing an image pickup system including at least an image pickup device into a stand-by state in which the image pickup system can commence an image pickup operation immediately in response to a release instruction, wherein if the stand-by mode is set, a preliminary operation for image pickup can be entered even if a shutter release switch is not pressed; and
executing a preliminary operation for image pickup if both at least one of the plurality of detectors detects the contact or approach of a hand, wherein the preliminary operation can commence even if a shutter release switch is not pressed.

20. The camera of claim 1 wherein at least one of the detectors is adapted to detect an approach of a hand.

21. The camera of claim 9 wherein at least one of the detectors is adapted to detect an approach of a hand.

22. The method of claim 10 wherein the act of detecting detects an approach of a hand.

23. The method of claim 19 wherein the act of detecting detects an approach of a hand.

24. The camera of claim 1 wherein at least one of the detectors is a pyroelectric sensor.

25. The camera of claim 1 wherein at least one of the detectors is a photosensor.

26. The camera of claim 9 wherein at least one of the detectors is a pyroelectric sensor.

27. The camera of claim 9 wherein at least one of the detectors is a photosensor.

28. An electronic camera comprising:

a plurality of detectors which are provided respectively at different positions, each of which detectors being adapted to detect contact or approach of a hand to make an image pickup operation;

a mode setup unit which sets up a stand-by mode in which an image pickup device can commence an image pickup operation immediately in response to a release instruction, wherein the stand-by mode can be entered even if a shutter release switch is not pressed; and an image pickup controller which controls the camera to perform a preliminary operation for image pickup if both the stand-by mode is set by the mode setup unit all of the plurality of detectors detect the contact or approach of a hand, wherein, initially, a first one of the detectors is rendered operational while a second one of the detectors is rendered non-operational until a contact or approach of a hand is sensed by the first one of the detectors, at which time the second one of the detectors is rendered operational.

29. An electronic camera comprising:

a plurality of detectors which are provided respectively at different positions, each of which detectors being adapted to detect contact or approach of a hand;

a mode setup unit which sets up a stand-by mode in which an image pickup device can commence an image pickup operation immediately in response to a release instruction, wherein the stand-by mode can be entered even if a shutter release switch is not pressed; and an image pickup controller which executes a preliminary operation for image pickup if both the stand-by mode is set by the mode setup unit, and at least one of the plurality of detectors detects the contact or approach of a hand, wherein, initially, a first one of the detectors is rendered operational while a second one of the detectors is rendered non-operational until a contact or approach of a hand is sensed by the first one of the detectors, at which time the second one of the detectors is rendered operational.

* * * * *